United States Patent
Aimura

(10) Patent No.: US 9,235,990 B2
(45) Date of Patent: Jan. 12, 2016

(54) VEHICLE PERIPHERY MONITORING DEVICE

(71) Applicant: HONDA MOTOR CO., LTD., Minato-Ku, Tokyo (JP)

(72) Inventor: Makoto Aimura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/360,005

(22) PCT Filed: Oct. 5, 2012

(86) PCT No.: PCT/JP2012/075934
§ 371 (c)(1),
(2) Date: May 22, 2014

(87) PCT Pub. No.: WO2013/077096
PCT Pub. Date: May 30, 2013

(65) Prior Publication Data
US 2014/0285667 A1    Sep. 25, 2014

(30) Foreign Application Priority Data

Nov. 25, 2011    (JP) .................................. 2011-256939

(51) Int. Cl.
*G08G 1/16*    (2006.01)
*H04N 7/18*    (2006.01)
*B60R 1/00*    (2006.01)

(52) U.S. Cl.
CPC .. *G08G 1/16* (2013.01); *B60R 1/00* (2013.01); *G08G 1/166* (2013.01); *H04N 7/18* (2013.01);
(Continued)

(58) Field of Classification Search
CPC .... B60R 1/00; B60R 2300/105; B60R 11/04; B60R 2300/802; H04N 7/181; G06K 9/00798; G06K 9/32; G06K 9/6211; G06K 9/00805; G06K 9/00825; G06K 2209/07; G06K 9/00369; G06K 9/00791; B60T 7/12; B60T 2201/022; B60T 2201/08; B60T 2210/34; B60T 8/32
USPC .......................................................... 348/148
See application file for complete search history.

(56) References Cited

U.S. PATENT DOCUMENTS

2007/0291987 A1* 12/2007 Saka .................. G06K 9/00805
                                                         382/103
2008/0130954 A1*  6/2008 Taniguchi .......... G06K 9/00805
                                                         382/104
(Continued)

FOREIGN PATENT DOCUMENTS

EP    1933255 A2    6/2008
JP    2003-284057 A  10/2003
(Continued)

OTHER PUBLICATIONS

Office Action with search report dated Mar. 9, 2015 issued over the corresponding Chinese Patent Application No. 201280057527.7 with the English translation of the pertinent portion.
(Continued)

*Primary Examiner* — Sath V Perungavoor
*Assistant Examiner* — Howard D Brown, Jr.
(74) *Attorney, Agent, or Firm* — Carrier Blackman & Associates, P.C.; Joseph P. Carrier; Fulchand P. Shende

(57) ABSTRACT

This vehicle periphery monitoring device appropriately determines whether or not an animal detected by an imaging device is a high-risk animal which may possibly contact the vehicle. For example, compared with an animal in a posture with the head facing downwards, an animal in a posture with the head facing upwards is determined to be a high-risk animal which may suddenly bolt, so the latter animal is enclosed in a thick red frame and highlighted as a warning, and an alarm is emitted from speakers.

6 Claims, 13 Drawing Sheets

(52) U.S. Cl.
CPC ..... *B60R 2300/106* (2013.01); *B60R 2300/205* (2013.01); *B60R 2300/307* (2013.01); *H04N 7/181* (2013.01)

(56) References Cited

U.S. PATENT DOCUMENTS

| | | | | |
|---|---|---|---|---|
| 2008/0260207 | A1* | 10/2008 | Nagaoka | G06T 7/0002 382/103 |
| 2009/0237269 | A1* | 9/2009 | Okugi | B60R 1/00 340/901 |
| 2010/0208075 | A1* | 8/2010 | Katsuno | B60Q 9/005 348/148 |
| 2011/0074916 | A1* | 3/2011 | Demirdjian | B60R 1/00 348/36 |
| 2011/0234422 | A1* | 9/2011 | Yamashita | G08G 1/166 340/901 |
| 2012/0072097 | A1* | 3/2012 | Ohta | B60R 1/00 701/118 |
| 2012/0081542 | A1* | 4/2012 | Suk | G06K 9/00805 348/139 |
| 2012/0218093 | A1* | 8/2012 | Yoshizawa | B60R 1/00 340/435 |

FOREIGN PATENT DOCUMENTS

| | | | |
|---|---|---|---|
| JP | 4173901 | B2 | 10/2008 |
| JP | 4267657 | B2 | 5/2009 |
| JP | 2009-295018 | A | 12/2009 |
| JP | 2010-049635 | A | 3/2010 |
| JP | 2010188970 | A | 9/2010 |
| JP | 2011216003 | A | 10/2011 |

OTHER PUBLICATIONS

Li, Liu and Li: "A New Discriminating Method of Big Quadrupeds' Posture," Computer Knowledge and Technology (Academic Exchange), May 2007, pp. 1383, 1384 and 1393.

Liu et al., "Behavior Animation for Simulation of Virtual Pedestrians Near a Road", Intelligent Transportation Systems, 2003. Proceedings. 2003 IEEE Oct. 12-15, 2003, Piscataway, New Jersey, USA, IEEE, vol. 2, Oct. 12, 2003, pp. 1422-1425, XP010672883, ISBN: 978-0-7803-8125-4, pp. 1422-1424.

Untaroiu et al., "Crash reconstruction of pedestrian accidents using optimization techniques", International Journal of Impact Engineering, Pergamon, GB, vol. 36, No. 2, Feb. 1, 2009, pp. 210-219, XP025800265, ISSN: 0734-743X, DOI: 10.1016/J.IJIMPENG.2008.01.012. Abstract.

Zhou et al., "Tracking-Based Deer Vehicle Collision Detection Using Thermal Imaging", Robotics and Biomimetics (Robio), 2009 IEEE International Conference on, IEEE, Piscataway, New Jersey, USA, Dec. 19, 2009, pp. 688-693, XP031641882, ISBN: 978-1-4244-4774-9. The whole document.

Extended European search report dated Jul. 21, 2015 issued over the corresponding European Patent Application No. 12852352.9.

* cited by examiner

VEHICLE PERIPHERY MONITORING DEVICE

TECHNICAL FIELD

The present invention relates to a vehicle periphery monitoring apparatus (vehicle periphery monitoring device) for monitoring the periphery of a vehicle using an image captured by an infrared camera (grayscale image) mounted on the vehicle, and more particularly to a vehicle periphery monitoring apparatus which is suitable for use on a vehicle particularly when the vehicle travels at night or in dark places.

BACKGROUND ART

As disclosed in Japanese Laid-Open Patent Publication No. 2003-284057 (hereinafter referred to as "JP2003-284057A"), it has heretofore been customary for a vehicle periphery monitoring apparatus to detect an object such as a pedestrian or the like that may possibly collide with a vehicle, from images (a grayscale image and a binary image converted therefrom) of the periphery of the vehicle, which are captured by infrared cameras, and to provide information about the detected object to the driver of the vehicle.

More specifically, the vehicle periphery monitoring apparatus disclosed in JP2003-284057A detects, as an object, a high-temperature area in images in the periphery of the vehicle, which are captured by a set of left and right infrared cameras (stereo cameras), and calculates the distance up to the object by determining a parallax of the object in the left and right images. In addition, the vehicle periphery monitoring apparatus detects an object such as a pedestrian or the like that is likely to affect the travel of the vehicle, i.e., that may possibly collide with the vehicle, based on the direction in which the object moves and the position of the object, and issues a warning concerning the detected object (see paragraphs [0014] and [0018] of JP2003-284057A).

Japanese Patent No. 4267657 (hereinafter referred to as "JP4267657B") discloses a vehicle periphery monitoring apparatus, which captures at least two images (two frames) of an object in the periphery of a vehicle at a predetermined time interval, using a single infrared camera mounted on the vehicle. If the size of a present image of the object changes from the size of a preceding image of the object, the change in size becomes greater as the relative speed between the object and the vehicle is higher. As the relative speed between the object and the vehicle is higher, an arrival time, which any object that is present in front of the vehicle takes to arrive at the vehicle, becomes shorter. Consequently, even though a single infrared camera is used, the vehicle periphery monitoring apparatus can monitor the periphery of the vehicle by estimating the arrival time from the rate of change between the sizes of images of the object that are captured at the predetermined time interval (see paragraphs [0006], [0007], and [0061] of JP4267657B).

Japanese Patent No. 4173901 (hereinafter referred to as "JP4173901B") discloses a vehicle periphery monitoring apparatus, which detects animals other than people from among objects, because objects that are present in the periphery of a vehicle and that may possibly collide with the vehicle are not limited to pedestrians. Large animals such as a deer or the like may also be present on the road and may collide with the vehicle (see paragraph [0006] of JP4173901B).

SUMMARY OF INVENTION

The vehicle periphery monitoring apparatus disclosed in JP2003-284057A, which detects an object with stereo cameras and issues a warning about the detected object, is problematic in that it is highly costly since it carries two infrared cameras.

The vehicle periphery monitoring apparatus disclosed in JP4267657B, which uses a single infrared camera for a cost reduction, can be used to image pedestrians that move in fixed patterns along motion vectors, but is not satisfactory in terms of performance for imaging animals that move in irregular patterns not along motion vectors, because the distance accuracy is low.

The vehicle periphery monitoring apparatus disclosed in JP4173901B basically defects an animal from the shape of its torso based on the finding that the ratio of the horizontal width to vertical width of the torso of a quadrupedal animal can be distinguished from the ratio of the horizontal width to vertical width of the torso of a bipedal human being (see paragraphs [0005] and [0064] of JP4173901B).

The present invention has been made in connection with the above background-art technologies. It is an object of the present invention to provide a vehicle periphery monitoring apparatus which is capable of accurately judging at a reduced cost whether or not a detected animal is an animal that is so dangerous as to possibly affect the way in which a vehicle incorporating the vehicle periphery monitoring apparatus travels.

According to the present invention, there is provided a vehicle periphery monitoring apparatus for monitoring the periphery of a vehicle using an image captured by an image capturing device mounted on the vehicle, including an animal detection processor configured to detect an animal as an object to be monitored from the image, and an animal hazard degree judgment section configured to judge whether the animal is a hazardous animal which may possibly affect the travel of the vehicle or not based on a posture shape of the animal which is detected from the image.

According to the present invention, the animal hazard degree judgment section judges whether or not the animal is a hazardous animal which may possibly affect the travel of the vehicle, not based simply on the position of the animal, but based on the posture shape of the animal. Therefore, it is possible to accurately judge a hazardous animal, and hence to appropriately call attention of the driver to the hazardous animal. Since it is possible to judge an animal without using distance information, the processing load can be reduced, and the judgment can be performed quickly. Therefore, the vehicle periphery monitoring apparatus can use a low-rate CPU and can be reduced in cost. As described later, the present invention can be implemented even if the image capturing device is a single image capturing device.

The animal hazard degree judgment section may judge that the animal is a hazardous animal if legs are detected in the posture shape of the animal. An animal that is positioned on a road has its legs detected, and an animal that is positioned outside of the road does not have its legs detected because such an animal is often positioned on a tuft of grass or the like. Therefore, it is possible to judge whether an animal is positioned on the road or outside of the road by judging whether the animal shows its legs or not.

The animal hazard degree judgment section may judge that the animal is a hazardous animal if the angle of a neck of the animal with respect to a torso thereof is directed upwardly in the posture shape of the animal. Since an animal with the angle of its neck with respect to the torso being directed downwardly, does not jump out abruptly, it is possible to judge the animal with the angle of the neck directed upwardly as more hazardous than the animal with the angle of the neck directed downwardly.

The animal hazard degree judgment section may judge that the animal is a hazardous animal if the distance from the position of the animal to a road edge to which the face of the animal is directed is greater than a predetermined distance. An animal which is spaced by a longer distance from the road edge toward which the face of the animal is directed is regarded as staying on the road for a long period of time. Therefore, it is possible to judge such an animal as a hazardous animal.

When the animal hazard degree judgment section detects a plurality of candidates for hazardous animals from the image, the animal hazard degree judgment section may judge one of the detected candidates for the hazardous animals which contacts a road surface at a position that is closest to the vehicle, as a hazardous animal.

When the animal hazard degree judgment section detects a plurality of candidates for hazardous animals from the image, the animal hazard degree judgment section may judge one of the detected candidates for the hazardous animals that is present in a position closest to the direction of travel of the vehicle, as a hazardous animal.

The image capturing device may include a single image capturing device. Though the single image capturing device is unable to accurately detect the distance up to an object instantaneously unlike stereo cameras which can accurately detect the distance up to an object based on the parallax about the object between two images captured respectively thereby, even when the single image capturing device is used, the vehicle periphery monitoring apparatus of the present invention can judge whether the animal is a hazardous animal or not based on the posture shape of the animal. Thus, it is possible to accurately and instantaneously judge whether the animal is a hazardous animal or not from one image at low cost.

According to the present invention, it is judged whether or not the animal is a hazardous animal which may possibly affect the travel of the vehicle, not based simply on the position of the animal, but based on the posture shape of the animal. Therefore, it is possible to accurately judge whether the detected animal is a hazardous animal which may possibly affect the travel of the vehicle.

DESCRIPTION OF EMBODIMENTS

A preferred embodiment of the present invention will be described below with reference to the drawings.

Figure 1:
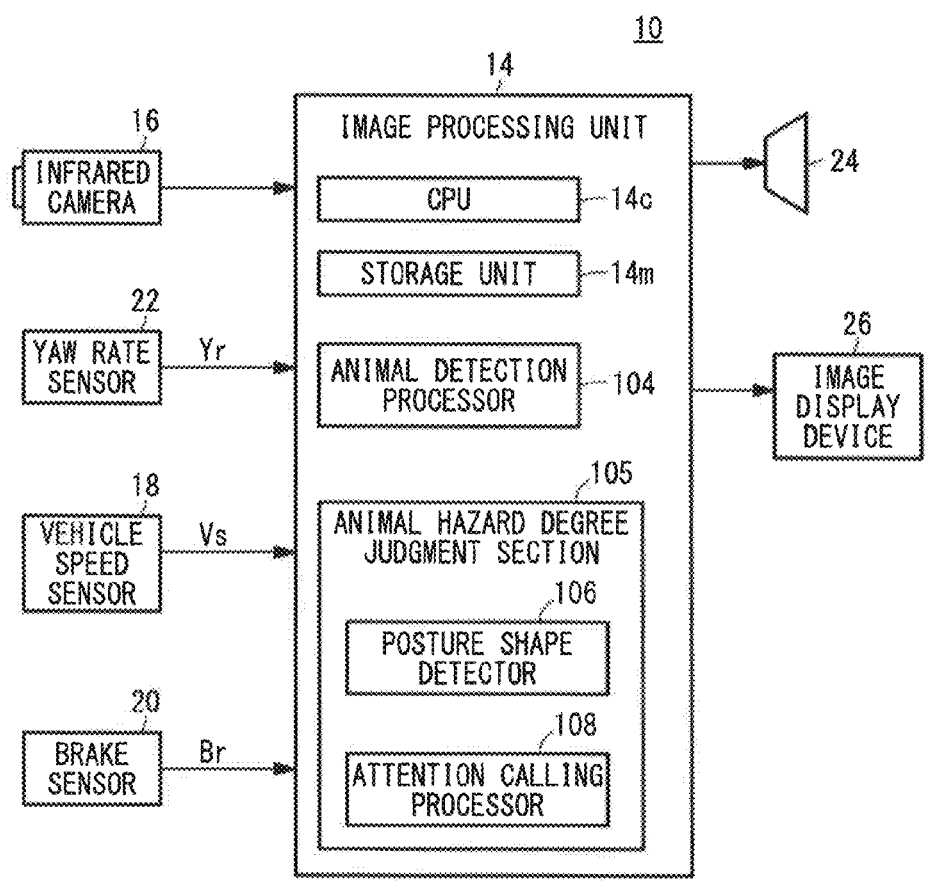
FIG. 1 a block diagram showing a configuration of a vehicle periphery monitoring apparatus according to an embodiment of the present invention.
Figure 2:
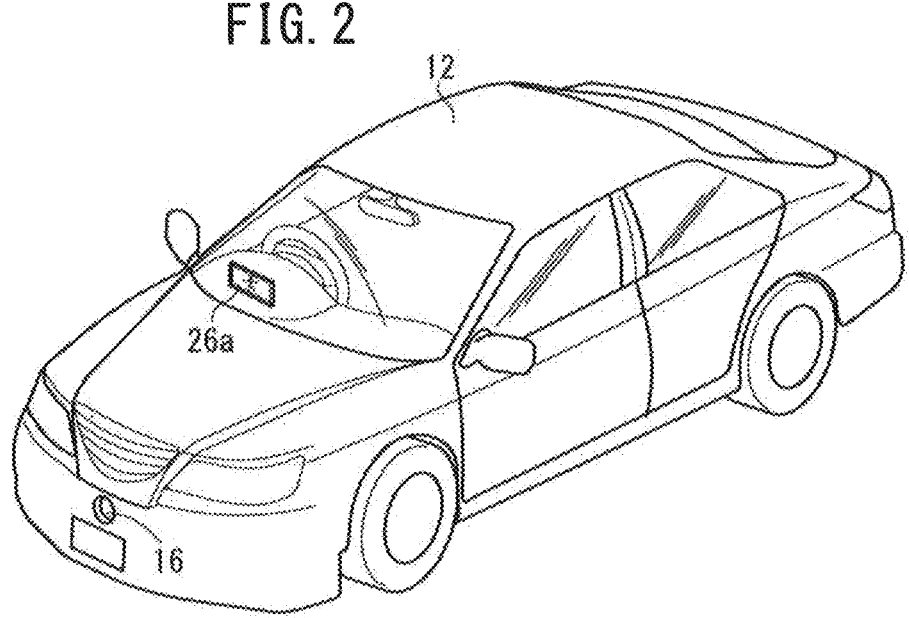
FIG. 2 is a perspective view of a vehicle that incorporates therein the vehicle periphery monitoring apparatus shown in FIG. 1.

FIG. 1 shows in block form the configuration of a vehicle periphery monitoring apparatus 10 according to an embodiment of the present invention. FIG. 2 shows in perspective a vehicle 12 that incorporates therein the vehicle periphery monitoring apparatus 10 shown in FIG. 1.

As shown in FIGS. 1 and 2, the vehicle periphery monitoring apparatus 10 has an image processing unit 14 for controlling the vehicle periphery monitoring apparatus 10, a single (monocular) infrared camera 16 (image capturing device) connected to the image processing unit 14, a vehicle speed sensor 18 for detecting a vehicle speed Vs of the vehicle 12, a brake sensor 20 for detecting a manipulated variable Br of a brake pedal (brake manipulated variable) that is operated by the driver of the vehicle 12, a yaw rate sensor 22 for detecting a yaw rate Yr of the vehicle 12, a speaker 24 for issuing an audible warning in the form of speech or the like, and an image display device 26 which comprises a HUD (Head Up Display) 26a for displaying images captured by the infrared camera 16 in order to enable the driver of the vehicle 12 to recognize a hazardous animal which may possibly affect the travel of the vehicle 12.

The image display device 26 is not limited to the HUD (Head Up Display) 26a, but may comprise a display device for displaying a map of a navigation system that is mounted in the vehicle 12, or a display device (MID device: Multi-Information Display device) provided in a meter unit or the like for displaying mileage, etc.

According to the present invention, target objects whose risk of colliding with the vehicle 12 is to be judged, i.e., degree of hazard is to be judged, are animals. Therefore, the known process of judging the degree of risk concerning human being such as pedestrians (see JP2003-284057A and JP4267657B) will not be described below for an easier understanding of the present invention and also for the sake of brevity.

The image processing unit 14 detects an animal in front of the vehicle 12 based on an infrared image of the periphery of the vehicle 12 and signals, which represent a traveling state of the vehicle 12 (the vehicle speed Vs, the brake manipulated variable Br, and the yaw rate Yr in the present invention). If the image processing unit 14 judges that the detected animal is a hazardous animal which may possibly affect the travel of the vehicle 12, the image processing unit 14 issues a warning, e.g., a beeping sound, from the speaker 24, and displays the hazardous animal in a captured image, which is displayed as a grayscale image on the HUD 26a, in such a highlighted manner that the hazardous animal is surrounded by a distinct color frame, which may be red or the like, thereby calling the attention of the driver.

The image processing unit 14 includes an input circuit such as a A/D converter circuit, etc., for converting an input analog signal into a digital signal, an image memory (storage unit 14*m*) for storing a digital image signal, a CPU (Central Processing Unit) 14*c* for performing various processing operations, a storage unit 14*m* including a RAM (Random Access Memory), which is used to store data during the processing by the CPU 14*c*, and a ROM (Read Only Memory), which is used to store a program executed by the CPU 14*c*, together with tables, maps, and templates {animal shaped templates: rightward, leftward, forward (and backward), etc. for deer, dogs, etc.}, a clock and timer, and an output circuit for supplying a drive signal for the speaker 24 and a display signal for the image display device 26. The infrared camera 16, the yaw rate sensor 22, the vehicle speed sensor 18, and the brake sensor 20 supply output signals, respectively, to the image processing unit 14 wherein the output signals are converted by the input circuit into digital signals, which are supplied to the CPU 14*c*.

The CPU 14*c* of the image processing unit 14 reads the supplied digital signals, executes the program while referring to the tables, the maps, and the templates, thereby functioning as various functioning means (also referred to as functioning sections), and supplies drive signals, i.e., a speech signal and a display signal, to the speaker 24 and the image display device 26. Such functions may also be implemented by way of hardware.

According to the present embodiment, the image processing unit 14 has an animal detection processor 104 and an animal hazard degree judgment section 105. The animal hazard degree judgment section 105 includes a posture shape detector 106 and an attention calling processor 108.

Basically, the image processing unit 14 runs an object recognition processing (object detection processing) program for recognizing an object by comparing an image acquired by the infrared camera 16 with pattern templates representing animal shapes, human body shapes, vehicle shapes, and artificial structure shapes which are stored in the storage unit 14*m*.

As shown in FIG. 2, the infrared camera 16 is mounted on the front bumper of the vehicle 12 at a central position in the transverse directions of the vehicle 12. The infrared camera 16 has such characteristics that, as the temperature of an object the image of which is captured by the infrared camera 16 is higher, the output signal (captured image signal) of the infrared camera 16 exhibits a higher level, i.e., a higher brightness level.

The HUD 26*a* is arranged so as to display a screen on the front windshield of the vehicle 12 at a position that does not obstruct the field of vision of the driver seated on the driver's seat in the vehicle 12.

The image processing unit 14 performs the above functions so as to convert an analog video signal, which is generated by the infrared camera 16, into digital data at a frame clock interval or period of several tens ms, e.g., 1 second per 30 frames [ms], to store the digital data in the storage unit 14*m* (image memory), and to carry out various processing operations on images in front of the vehicle 12, which are stored in the storage unit 14*m*.

The animal detection processor 104 extracts an image segment of an animal candidate from the image in front of the vehicle 12 that is stored in the storage unit 14*m*, and detects the extracted image segment as an animal candidate.

The posture shape detector 106 of the animal hazard degree judgment section 105 detects the posture shape of the animal candidate that has been detected by the animal detection processor 104. The posture shape may represent whether the animal candidate shows all legs, whether the neck of the animal candidate is directed upwardly or downwardly with respect to the torso thereof, whether the face direction of the animal candidate faces to the right or the left, and whether a portion of the animal candidate that contacts the road surface is its legs or its torso.

The animal hazard degree judgment section 105 judges whether the animal candidate is a hazardous animal which may possibly affect the travel of the vehicle 12 or not based on the posture shape of the animal candidate detected by the posture shape detector 106. If the animal hazard degree judgment section 105 judges that the animal candidate is a hazardous animal, then the attention calling processor 108 of the animal hazard degree judgment section 105 performs an attention calling process for indicating to the driver, i.e., warning the driver, that the animal candidate is a hazardous animal.

A process of calculating a time until and a distance to the vehicle 12 collides with an object by use of the single infrared camera 16 will be described below. The image processing unit 14 calculates a rate of change Rate of the size of an image segment of one monitored object (animal in this case) between images that are captured at the frame clock interval or period (predetermined time interval) by the infrared camera 16, calculates a time (also referred to as "collision margin time") TTC (Time To Contact or Time To Collision), which represents a time it takes the monitored object (animal) to arrive at the vehicle 12, using the rate of change Rate, and calculates the position of the monitored object (animal) in an actual space, i.e., a distance Z from the vehicle 12 to the monitored object (animal).

The collision margin time TTC it takes for the monitored object (animal) to arrive at the vehicle 12 can be determined from the rate of change Rate (determined from the images) and an image capturing interval (frame clock period) dT (known), which is a predetermined time interval, in a manner as disclosed in JP4267657B, according to the following expression (1):

$$TTC = dT \times \text{Rate}/(1-\text{Rate}) \tag{1}$$

The rate of change Rate can be determined from the ratio of the width or length W0 (which may be stored as the number of pixels) of the monitored object (animal) in the previously captured image thereof to the width or length W1 (the number of pixels) of the monitored object (animal) in the presently captured image thereof (Rate=W0/W1).

The distance Z up to the monitored object (animal) can be determined, as disclosed in JP4267657B, according to the following expression (2):

$$Z = \text{Rate} \times Vs \times dT/(1-\text{Rate}) \tag{2}$$

where Vs represents, more accurately, the relative speed between the monitored object (animal) and the vehicle 12. The relative speed is equal to the vehicle speed Vs if the monitored object (animal) stays still.

Basically, the vehicle periphery monitoring apparatus 10 is constructed and operates as described above. Detailed operation of the vehicle periphery monitoring apparatus 10 will be described below with reference to a flowchart shown in FIG. 3.

Figure 3:
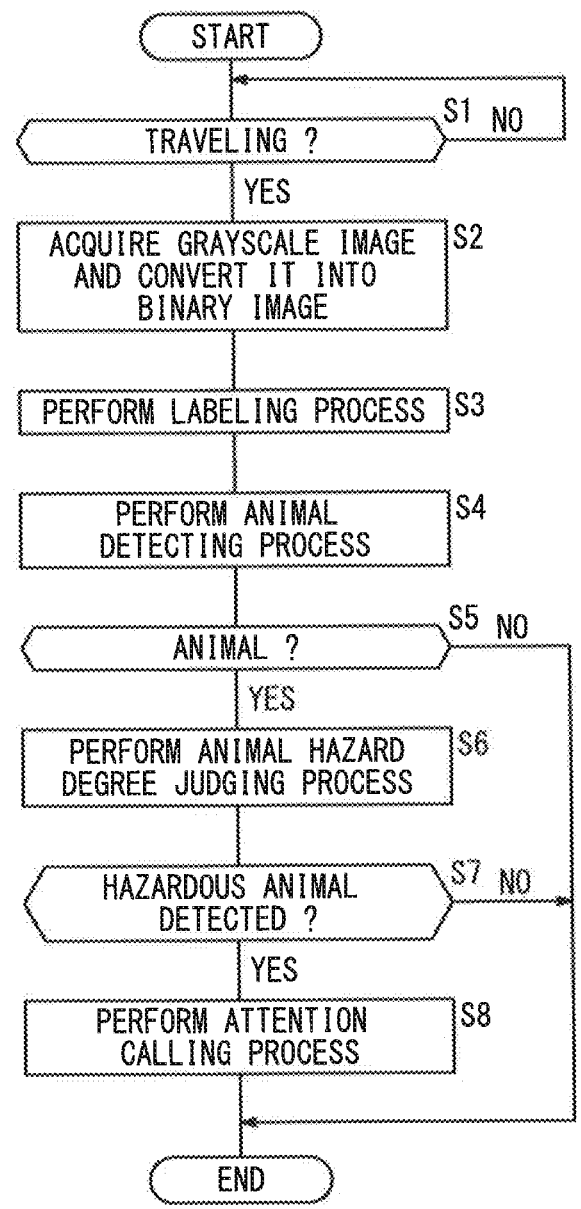
FIG. 3 is a flowchart of an operation sequence of an image processing unit of the vehicle periphery monitoring apparatus.

First, in step S1, the image processing unit 14 judges the travelling state of the vehicle 12, i.e., whether the vehicle 12 is traveling or is at rest, from the vehicle speed Vs detected by the vehicle speed sensor 18. If the vehicle 12 is at rest (step S1: NO), then the operation sequence shown in FIG. 3 is stopped.

If the vehicle 12 is traveling (step S1: YES), then in step S2 the image processing unit 14 acquires a captured infrared image, which is represented by an analog image signal generated by the infrared camera 16 in each frame within a predetermined angular field in front of the vehicle 12. The image processing unit 14 converts the analog image signal into a digital image signal, which represents a grayscale image, stores the grayscale image in the image memory (storage unit 14m), carries out a binarizing process for converting the grayscale image into a binary image, in which areas brighter than a predetermined brightness threshold value are represented by a pixel value of "1" (white) and areas darker than the predetermined brightness threshold value are represented by a pixel value of "0" (black), and then stores the binary image in each frame in the storage unit 14m such that the binary images are associated with the respective frames. In the binarizing process, a cluster (human object candidate) of a head, shoulders, a torso, and two legs is detected as a cluster of pixel values of "1" (set). Further, regarding an animal (quadruped animal in the present embodiment) such as a dog (small animal), a deer (large animal), etc., a cluster (animal object candidate) of a head, a torso, a tail, and four legs is similarly detected as a cluster of pixel values of "1" (set).

In step S3, the image processing unit 14 carries out a labeling process that converts the pixels having values of "1" (white) of the binary image in each frame (image) into run-length data for each scanning line along the x direction (horizontal direction), while regarding lines having overlapping portions along the y direction (vertical direction) as an object. In addition, the image processing unit 14 applies labels to rectangles circumscribing such objects. For example, the circumscribing rectangles are labeled as animal candidate areas 152a, 152b shown in FIGS. 4 and 5.

Figure 4:
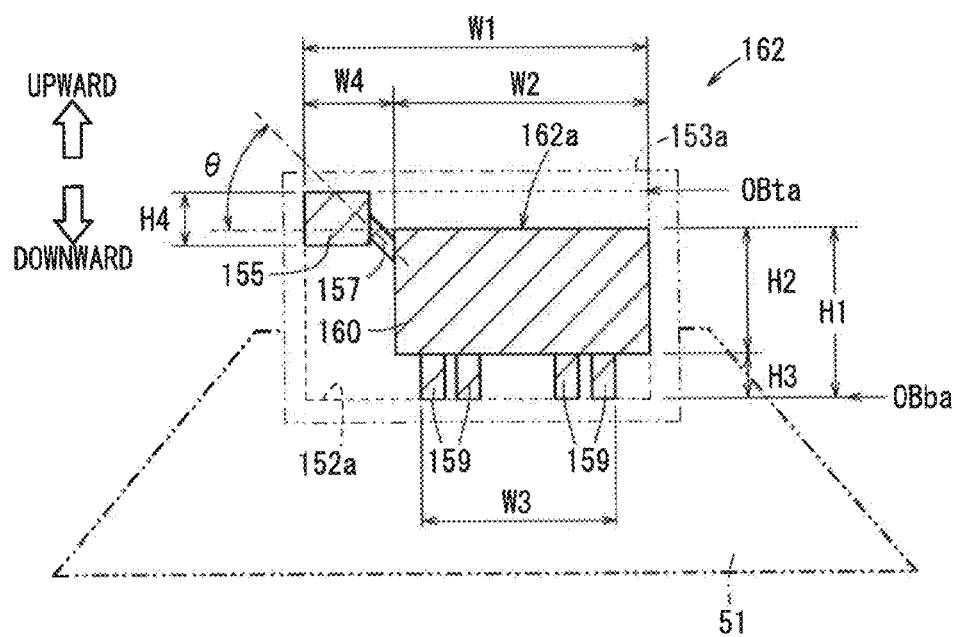
FIG. 4 is a diagram showing an image of an animal, which is used in an animal detecting process.
Figure 5:
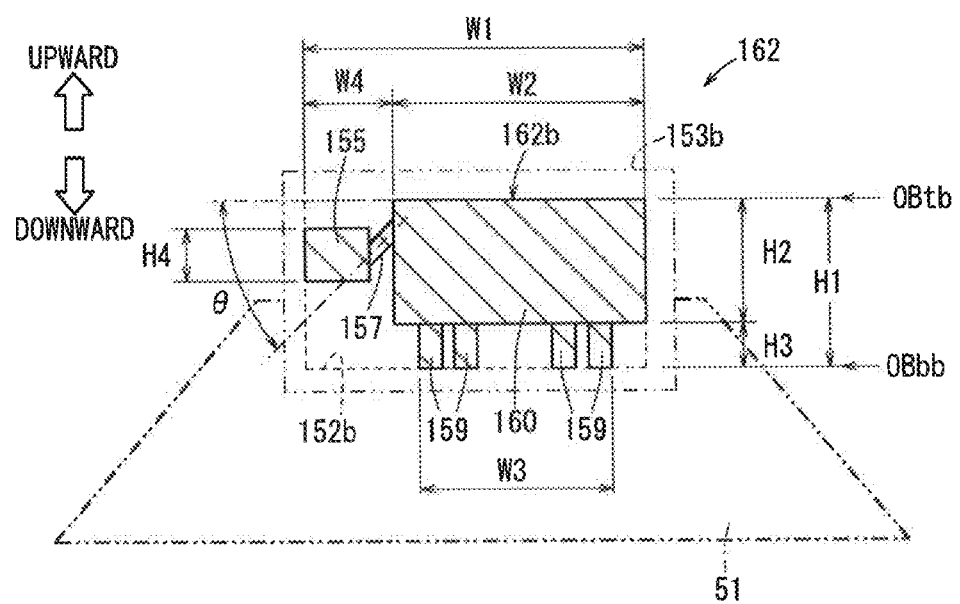
FIG. 5 is a diagram showing another image of the animal, which is used in the animal detecting process.

In step S4, the animal detection processor 104 scans, downwardly and from the left to the right, the pixel values in a mask area 153a, shown as a dot-and-dash-line area in FIG. 4, and a mask area 153b, shown as a dot-and-dash-line area in FIG. 5, in the image which includes the labeled animal candidate areas 152a, 152b, the mask areas 153a, 153b being slightly larger than the labeled animal candidate areas 152a, 152b, respectively. If the animal detection processor 104 detects a succession of pixel values "0" representing a darker area, then the animal detection processor 104 determines the detected succession of pixels to be a boundary between each of animal candidates 162a, 162b (which is made up of a head 155, a neck 157, a torso 160, and legs 159, and is hereinafter referred to as an animal candidate 162), and a road surface 51 in the image, and regards the boundary as a lower end (also referred to as a road surface contact position) OBba, OBbb of the object.

Further, the animal detection processor 104 scans, upwardly from each of the lower ends OBba, OBbb of the animal candidates 162a, 162b, from the left to the right, the pixel values in each of the mask areas 153a, 153b. If the animal detection processor 104 detects a scanned zone where the brightness changes vertically (e.g., a zone where pairs of pixel values "1" and "0" are roughly successive in the binary image), then the animal detection processor 104 determines the detected zone to be a boundary between each of the animal candidates 162a, 162b and the background, and regards the boundary as an upper end OBta, OBtb of the object.

There are various ways of judging whether an object candidate is an animal candidate 162 (162a in FIG. 4 or 162b in FIG. 5). For example, if an object candidate has a horizontally long region (corresponding to the torso 160) wherein the ratio W2/H2 of a horizontal width W2 to a vertical width H2 is in a range greater than a value "1" {(W2/H2)>1} and two or more regions (up to four regions corresponding to the legs 159) existing beneath the horizontally long region wherein the ratio W3/H3 of a width W3 between the left and right ends of the two or more regions to a vertical width H3 is greater than a value "1" {(W3/H3)>1}, then the animal detection processor 104 judges the object candidate as an animal candidate 162.

Furthermore, for example, if the animal detection processor 104 detects three or more legs 159, preferably four legs 159, beneath the torso 160, then the animal detection processor 104 may judge the object candidate as an animal candidate 162.

In addition, if a horizontal edge line on the upper end of the torso 160, i.e., a horizontal line contacting the upper end at a height H1 in FIGS. 4 and 5, intersects with the head 155 (FIG. 4) or if the head 155 is positioned below the horizontal edge line on the upper end of the torso 160 (FIG. 5), then the animal detection processor 104 may judge the object candidate as an animal candidate 162.

In step S5, the animal detection processor 104 judges the result of the animal detecting process in step S4. If the animal detection processor 104 detects at least one animal candidate 162 in step S5 (step S5: YES), then an animal hazard degree judging process is carried out in step S6 to judge whether the animal candidate 162 is a hazardous animal which may possibly affect the travel of the vehicle 12, i.e., which may possibly collide with the vehicle 12, or not. If the animal detection processor 104 does not detect an animal candidate 162 (step S5: NO), the operation sequence from step S1 is repeated.

In step S7, based on the result of the animal hazard degree judging process in step S6, if a hazardous animal is detected (step S7: YES), then an attention calling process is carried out to call attention of the driver to the detected hazardous animal in step S8. In step S7, if a hazardous animal is not detected (step S7: NO), then the operation sequence from step S1 is repeated.

The animal hazard degree judging process carried out by the animal hazard degree judgment section 105 in step S6 and the attention calling process carried out by the attention calling processor 108 in step S8 will be described in detail below.

The animal hazard degree judgment section 105 operates the posture shape detector 106 to detect a posture shape of an animal candidate 162, and judges whether the animal candidate 162 is a hazardous animal which may possibly affect the travel of the vehicle 12 or not based on the detected posture shape. If a plurality of animal candidates 162 are detected in the captured image, then the animal hazard degree judgment section 105 judges one of the detected animal candidates 162 that has the highest risk of affecting the travel of the vehicle 12 as a hazardous animal.

Specifically, according to a first judging process carried out by the animal hazard degree judgment section 105 using the posture shape detector 106, if the posture shape detector 106 detects legs 159 in the posture shape of an animal candidate 162, then the animal hazard degree judgment section 105 judges the animal candidate 162 with the detected legs 159 as a hazardous animal.

Then, the attention calling processor 108 displays the animal candidate 162 judged as a hazardous animal in highlight in the image (screen).

Figure 6:
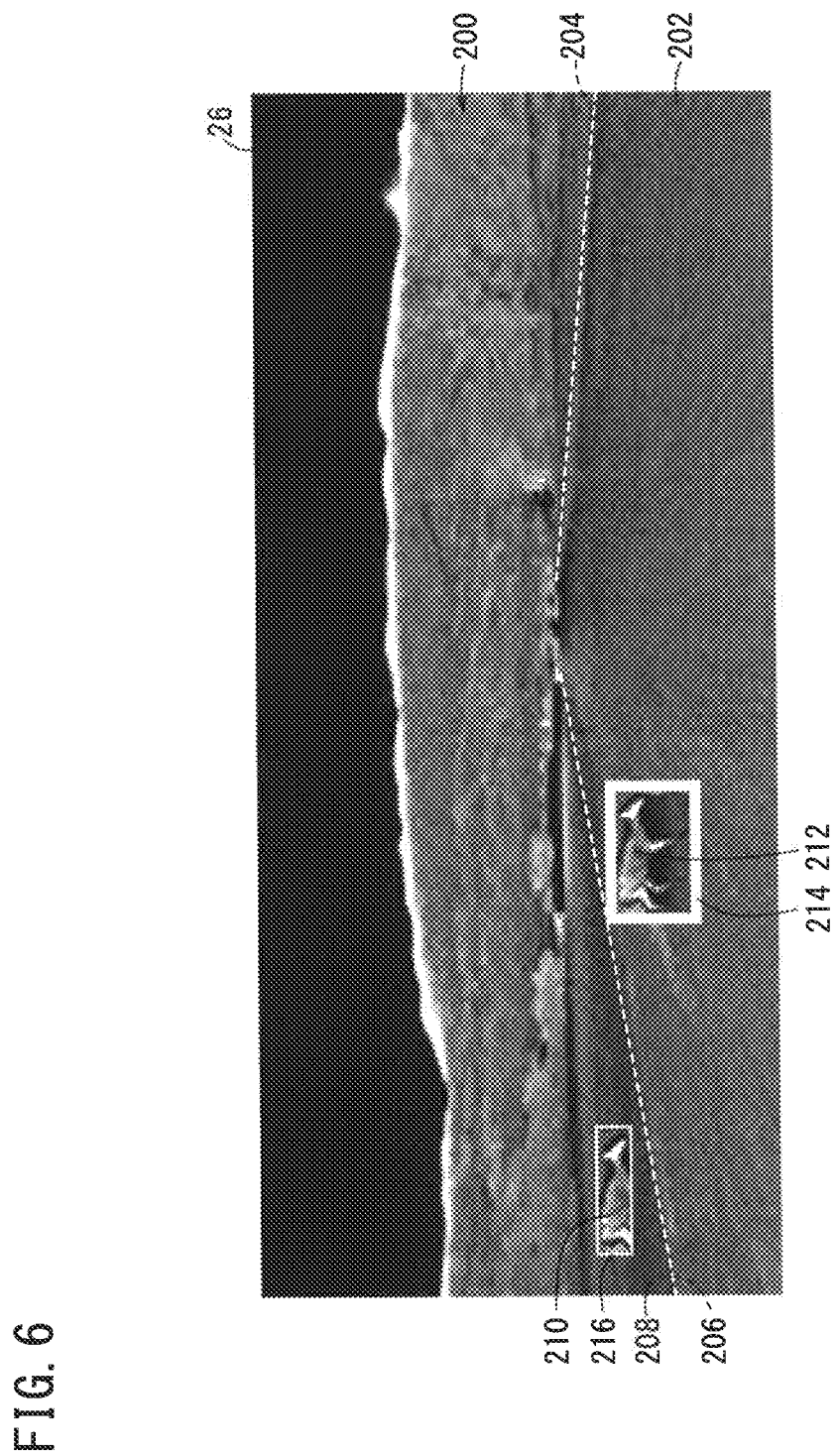
FIG. 6 is a diagram illustrating a grayscale image in which a hazardous animal is displayed in highlight.

FIG. 6 shows a grayscale image (video image) 200 displayed on the HUD 26a.

The grayscale image 200 shown in FIG. 6 has a horizontally central position representing the frontal direction of the infrared camera 16 on the vehicle 12. The grayscale image 200 includes a road 202 beneath the center thereof. The road 202 has a right road side edge (right road edge) 204 and a left road side edge (left road edge) 206, which are extracted by an edge detecting process or the like.

The grayscale image 200 also includes a tuft 208 of grass in an area on the left side of the center thereof in FIG. 6. Animals often tend to be present on the tuft 208 of grass outside of the road 202. It is possible to judge whether an animal is present on the road 202 or outside of the road 202 by judging whether there are legs 159 (FIGS. 4 and 5) or not.

The grayscale image 200 shown in FIG. 6 includes two displayed animals 210, 212 (deer in this case) which correspond to the respective animal candidates 162 (FIG. 4 or 5) that are detected by the animal detection processor 104. The left animal 210 has no legs detected, and the central animal 212 has legs 159 (FIGS. 4 and 5) detected.

According to the first judging process, the animal hazard degree judgment section 105 judges the animal candidate 162 with the detected legs 159 as a hazardous animal. Therefore, the central animal 212 is displayed in such a highlighted manner that the central animal 212 is surrounded by a red thick frame 214, for warning the driver. The left animal 210 is displayed and surrounded by a yellow thin frame 216 for warning the driver. When the central animal 212 is displayed and highlighted by surrounding the central animal 212 by the red thick frame 214, the speaker 24 issues a warning at the same time.

According to a second judging process, when the posture shape detector 106 detects that the angle θ of the neck 157 with respect to the torso 160 is directed upwardly (θ>0) in the posture shape of an animal candidate 162, the animal hazard degree judgment section 105 judges the animal candidate 162 with the upward neck 157, i.e., the animal candidate 162a shown in FIG. 4, as a hazardous animal.

Figure 7:
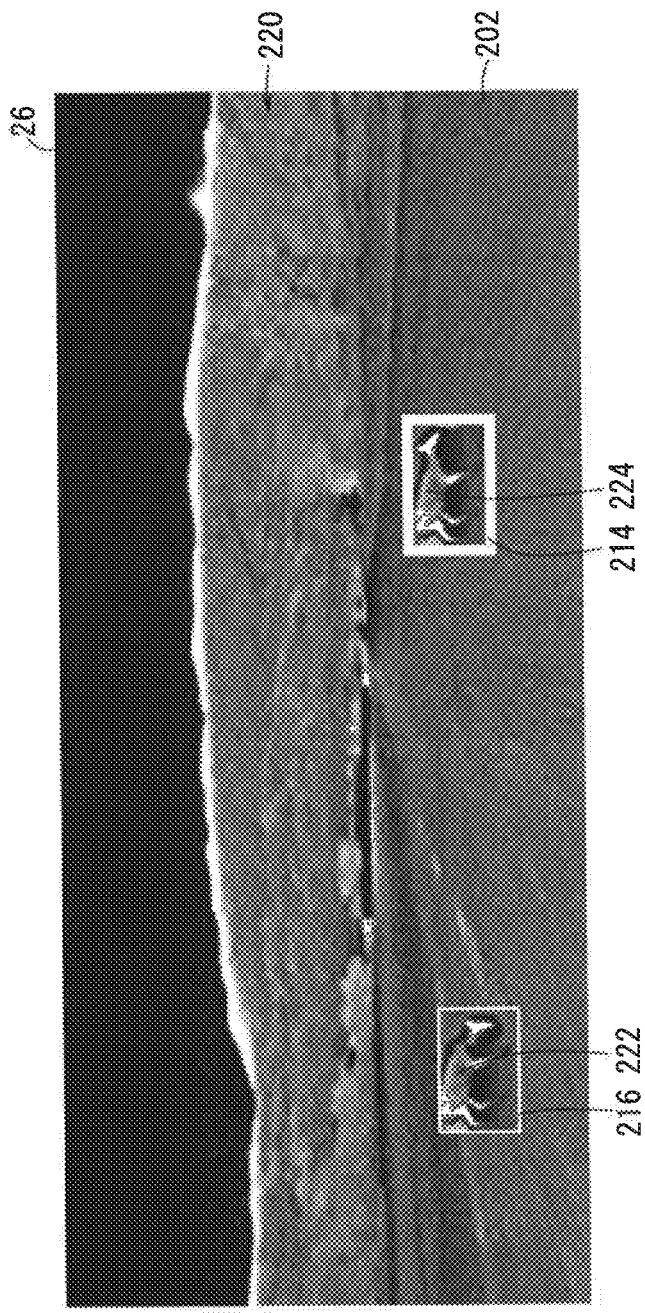
FIG. 7 is a diagram illustrating another grayscale image in which a hazardous animal is displayed in highlight.

FIG. 7 shows a grayscale image (video image) 220 displayed on the display area of the HUD 26a.

The grayscale image 220 shown in FIG. 7 includes two displayed animals 222, 224 (deer in this case) which correspond to the respective animal candidates 162 that are detected by the animal detection processor 104. The left animal 222 has a neck 157 directed downwardly (see FIG. 5), and the right animal 224 has a neck 157 directed upwardly (see FIG. 4). Since the animal 222 with the neck 157 directed downwardly does not jump out abruptly, the animal 224 with the neck 157 directed upwardly is more hazardous.

According to the second judging process, the animal hazard degree judgment section 105 judges the animal candidate 162b with the upward neck 157 as a hazardous animal. Therefore, the right animal 224 is displayed in such a highlighted manner that the right animal 224 is surrounded by a red thick frame 214, for warning the driver. The left animal 222 is displayed and surrounded by a yellow thin frame 216, for warning the driver. When the right animal 224 is displayed in such a highlighted manner with the right animal 224 being surrounded by the red thick frame 214, the speaker 24 issues a warning at the same time.

According to a third judging process, when the posture shape detector 106 detects, in the posture shape of an animal candidate 162, that the distance from the position of the animal candidate 162 to a road side edge to which the face of the animal candidate 162 is directed is greater than a predetermined distance, e.g., that the animal candidate 162 is positioned outside of the horizontally central position of the image, i.e., substantially the transversely central position of the road 202, the animal hazard degree judgment section 105 judges the animal candidate 162 as a hazardous animal.

Figure 8:
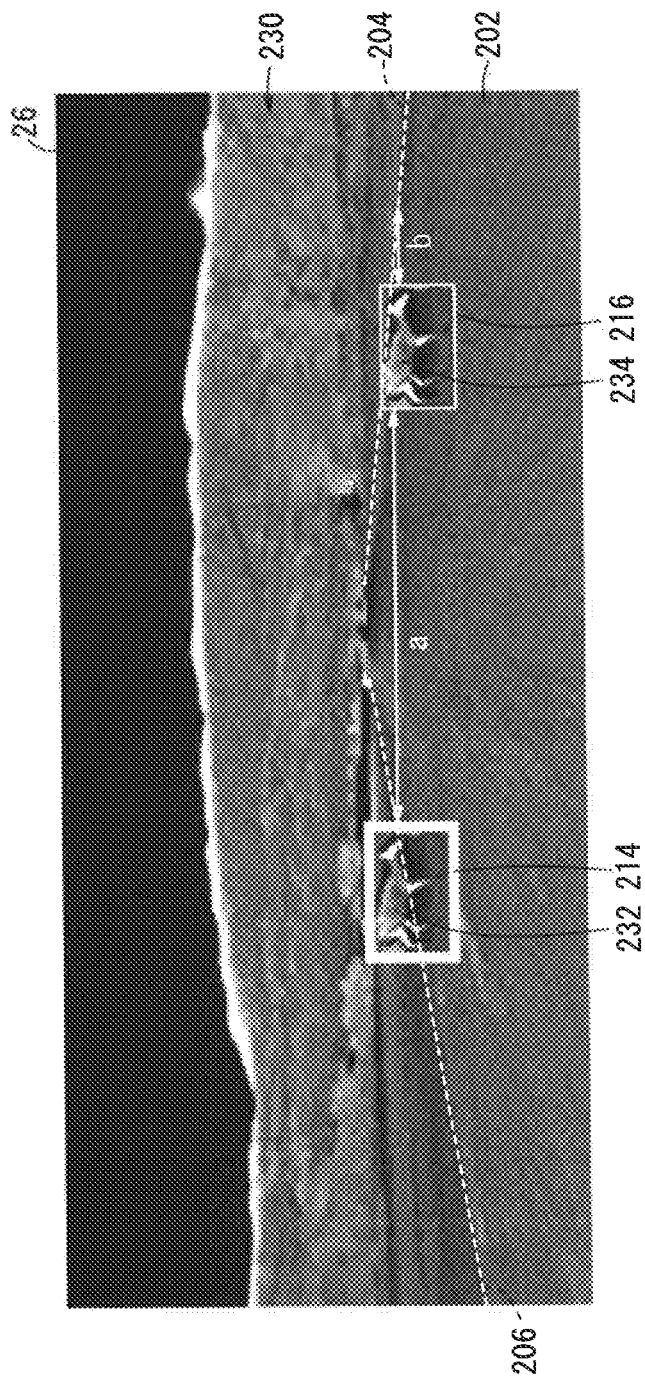
FIG. 8 is a diagram illustrating still another grayscale image in which a hazardous animal is displayed in highlight.

Specifically, a grayscale image 230 shown in FIG. 8 includes two displayed animals 232, 234 (deer in this case) which correspond to the respective animal candidates 162 that are detected by the animal detection processor 104, wherein the faces of the animals 232, 234 are directed toward the right road side edge 204. The distance "a" from the left animal 232 to the right road side edge 204 is greater than a predetermined distance, whereas the distance "b" from the right animal 234 to the right road side edge 204 is smaller than the predetermined distance (a>b).

The animal 232 which is spaced by the longer distance "a" from the road side edge to which the face of the animal 232 is directed (wherein the direction is regarded as the direction of the animal's movement) is regarded as staying on the road 202 for a longer period of time than the animal 234 which is spaced by the shorter distance "b" from the road side edge. Therefore, the animal hazard degree judgment section 105 judges the animal 232 as a hazardous animal.

According to the third judging process, the animal hazard degree judgment section 105 judges the left animal 232 as a hazardous animal. Therefore, the left animal 232 is displayed in a highlighted manner such that the left animal 232 is surrounded by a red thick frame 214, for warning the driver. The right animal 234 is displayed and surrounded by a yellow thin frame 216, for warning the driver. When the left animal 232 is displayed in a highlighted manner with the surrounding red thick frame 214, the speaker 24 issues a warning at the same time.

Figure 9:
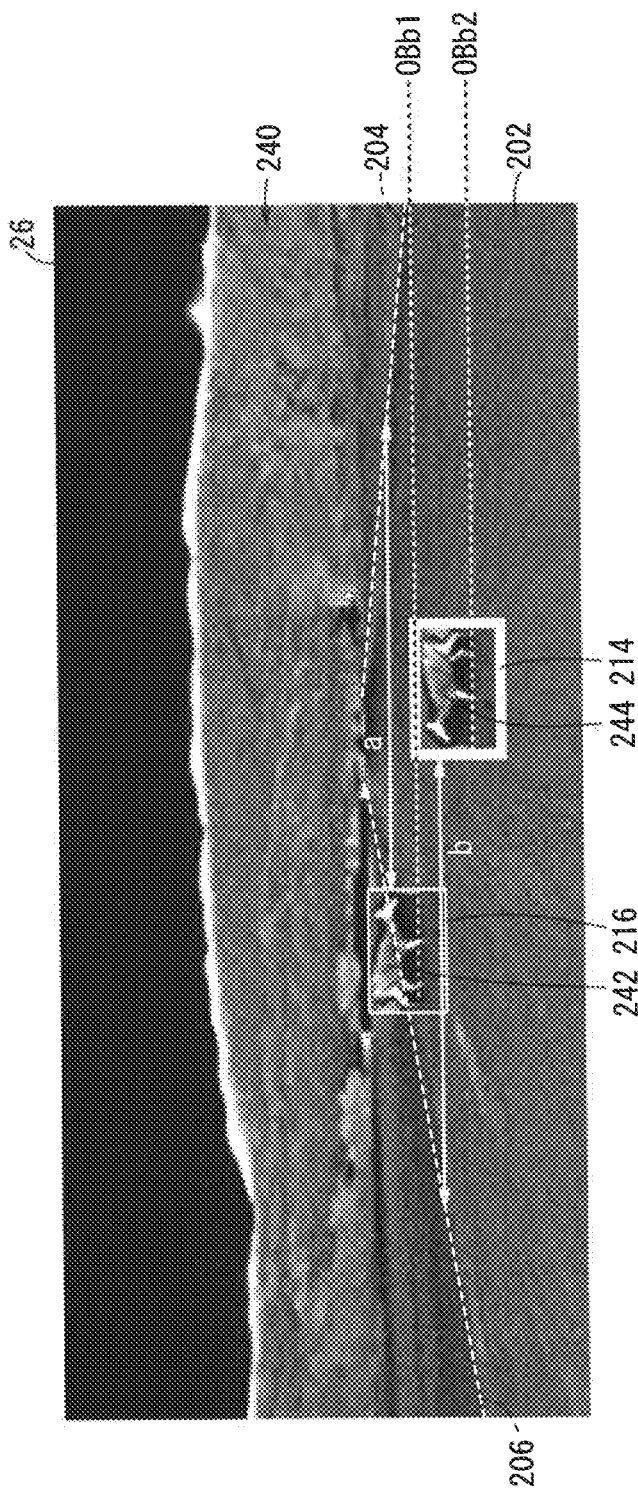
FIG. 9 is a diagram illustrating yet another grayscale image in which a hazardous animal is displayed in highlight.

According to a fourth judging process, if the animal hazard degree judgment section 105 detects a plurality of animal candidates having similar hazard degrees from the image according to either one of the first through third judging processes, e.g., in a case where the third judging process is performed on animals 242, 244 in a grayscale image 240 shown in FIG. 9, if it is detected that the distance "a" from the left animal 242, which faces toward the right of the road 202, up to the right road side edge 204 in FIG. 9 is substantially the same as the distance "b" from the right animal 244, which faces toward the left of the road 202, up to the left road side edge 206 in FIG. 9 (i.e., a≈b), the animal hazard degree judgment section 105 compares road surface contact positions OBb1, OBb2 where the lower ends of the respective animals 242, 244 contact the road 202, and judges the animal 244 whose road surface contact position OBb2 is closer to the vehicle 12 as a hazardous animal.

According to the fourth judging process, the animal hazard degree judgment section 105 judges the right animal 244 closer to the vehicle 12 as a hazardous animal. Therefore, the right animal 244 is displayed in a highlighted manner such that the right animal 244 is surrounded by a red thick frame 214, for warning the driver. The left animal 242 is displayed and surrounded by a yellow thin frame 216, for warning the driver. When the right animal 244 is displayed in highlight with the surrounding red thick frame 214, the speaker 24 issues a warning at the same time.

Figure 10:
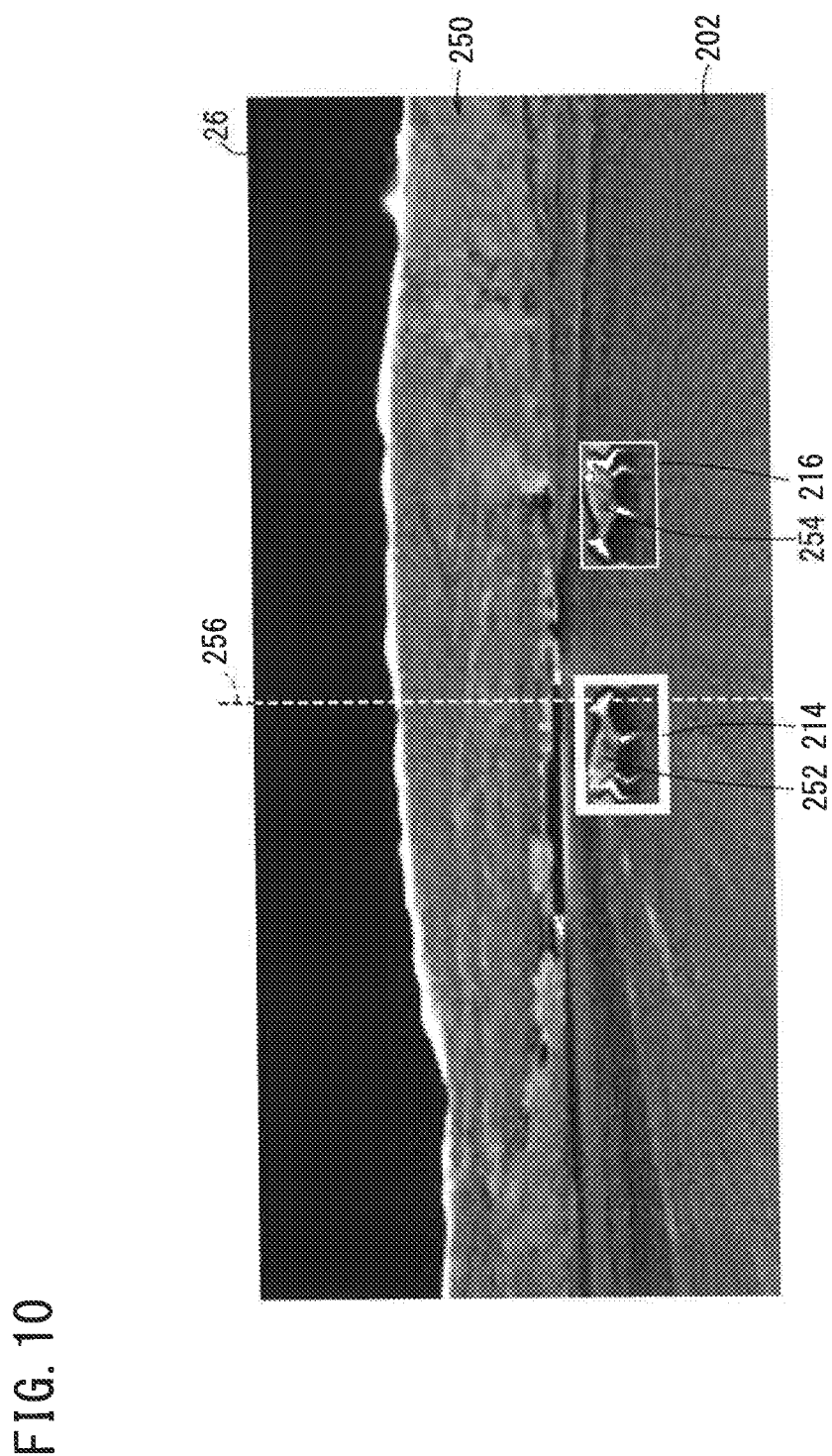
FIG. 10 is a diagram illustrating yet still another grayscale image in which a hazardous animal is displayed in highlight.

According to a fifth judging process, when the animal hazard degree judgment section 105 detects a plurality of animal candidates having similar hazard degrees from the image according to either one of the first through third judging processes, e.g., in a case where the first judging process is performed on animals 252, 254 in a grayscale 250 shown in FIG. 10, if it is detected that both the animals 252, 254 show their legs, the animal hazard degree judgment section 105 judges the animal 252 that is closer to an image center 256 (i.e., closer to the direction of travel of the vehicle 12) as a more hazardous animal than the animal 254 that is more spaced away from the image center 256.

According to the fifth judging process, the animal hazard degree judgment section 105 judges the left animal 252 that is positioned closer to the direction of travel of the vehicle 12 as a hazardous animal. Therefore, the left animal 252 is displayed in a highlighted manner such that the left animal 252 is surrounded by a red thick frame 214, for warning the driver. The right animal 254 is displayed and surrounded by a yellow thin frame 216, for warning the driver. When the left animal 252 is displayed in highlight with the surrounding red thick frame 214, the speaker 24 issues a warning at the same time.

Figure 11:
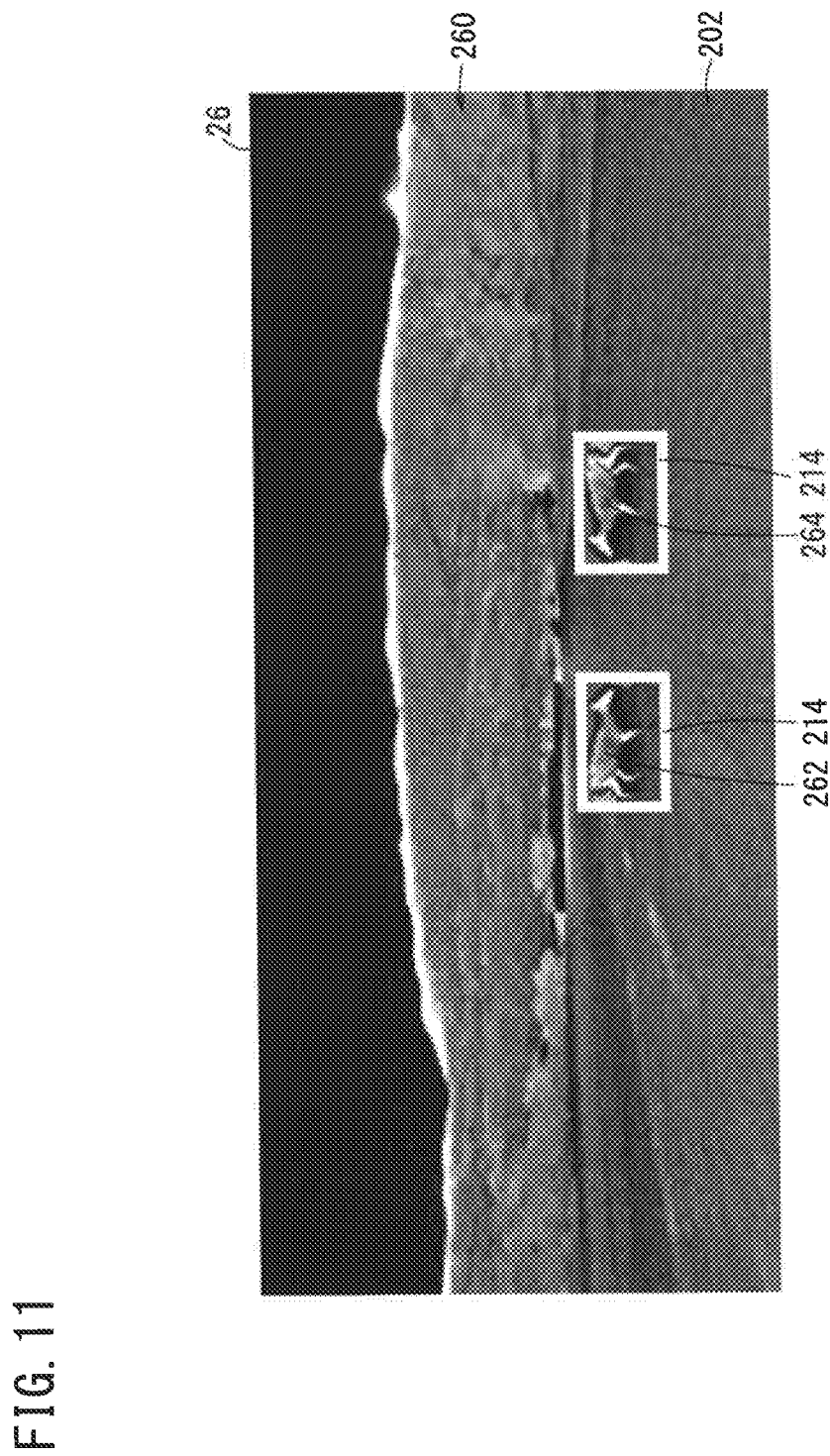
FIG. 11 is a diagram illustrating a grayscale image in which two hazardous animals are displayed in highlight.

If it is not possible to judge which one of plural animals has a higher hazard degree according to the first through fifth judging processes, e.g., if animals 262, 264 are present at respective positions in a grayscale image 260 shown in FIG. 11, then, according to a sixth judging process, the animal hazard degree judgment section 105 judges both the animals 262, 264 as hazardous animals, displays them in a highlighted manner such that each of the animals 262, 264 is surrounded by a red thick frame 214, for warning the driver, and also issues a warning through the speaker 24.

[Overview of the Embodiment]

As described above, the vehicle periphery monitoring apparatus 10 according to the above embodiment detects a hazardous animal from an image captured by the single infrared camera 16 mounted on the vehicle 12 and warns the driver of the vehicle 12 about the detected hazardous animal.

The vehicle periphery monitoring apparatus 10 has the animal detection processor 104 for detecting an animal as an object to be monitored from the image and the animal hazard degree judgment section 105 for judging whether the animal is a hazardous animal which may possibly affect the travel of the vehicle 12 or not depending on the posture shape of the animal detected from the image.

According to the present embodiment, it is judged whether or not the animal is a hazardous animal which may possibly affect the travel of the vehicle 12, not based simply on the position of the animal, but based on the posture shape of the animal. Therefore, it is possible to accurately judge a hazardous animal, and hence to appropriately call attention of the driver to the hazardous animal. Since the hazard degree of the animal is judged depending on the posture shape of the animal, it is possible to judge a hazardous animal without using distance information and motion vectors. Thus, its processing load is reduced, and then it becomes possible to judge a hazardous animal in a reduced judging time. Therefore, the vehicle periphery monitoring apparatus 10 can use a low-rate CPU and can be reduced in cost.

For example, according to the first judging process, if the animal hazard degree judgment section 105 detects legs 159 (see FIGS. 4 and 5) in the posture shape of the animal, then the animal hazard degree judgment section 105 may judge the animal as a hazardous animal. As shown in FIG. 6, the animal 212 positioned on the road 202 has its legs 159 detected, and the animal 210 positioned outside of the road 202 does not have its legs 159 detected because the animal is often positioned on the tuft 208 of grass. The animal hazard degree judgment section 105 can judge whether an animal is positioned on the road 202 or outside of the road 202 by judging whether the animal shows its legs or not.

According to the second judging process, if the animal hazard degree judgment section 105 detects that the angle θ of the neck 157 with respect to the torso 160 is directed upwardly (see FIG. 4) in the posture shapes of the animals 222, 224, as shown in FIG. 7, then the animal hazard degree judgment section 105 may judge the animal with the upward neck 157 as a hazardous animal. Since the animal 222 with the angle θ of the neck 157 with respect to the torso 160 being directed downwardly, does not jump out abruptly, the animal hazard degree judgment section 105 can judge the animal 224 with the neck 157 directed upwardly as more hazardous than the animal 222 with the neck 157 directed downwardly (see FIG. 7).

According to the third judging process, if the animal hazard degree judgment section 105 detects, in the posture shapes of the animals 232, 234, that the distance "a" from the position of the animal 232 to the right road side edge 204 to which the face of the animal 232 is directed is greater than a predetermined distance, i.e., ½ of the width of the road 202, as shown in FIG. 8, then the animal hazard degree judgment section 105 may judge the animal 232 as a hazardous animal. If the distance "a" from the position of the animal 232 to the right road side edge 204 toward which the face of the animal 232 is directed is greater than the predetermined distance, then the animal 232 can be regarded as staying on the road 202 for a long period of time, and thus the animal 232 can be judged as a hazardous animal.

According to the fourth judging process, if the animal hazard degree judgment section 105 detects a plurality of candidates for animals having high hazard degrees from the grayscale image 240, as shown in FIG. 9, then the animal hazard degree judgment section 105 may judge one 244 of the candidates for the hazardous animals 242, 244 whose road surface contact position OBb2 is closest to the vehicle 12, as a hazardous animal.

According to the fifth judging process, if the animal hazard degree judgment section 105 detects a plurality of candidates for animals having high hazard degrees from the grayscale image 250, as shown in FIG. 10, then the animal hazard degree judgment section 105 may judge one 252 of the candidates for the animals 252, 254 that is closer to the direction of travel of the vehicle 12, i.e., the image center 256, as a hazardous animal.

According to the above embodiment, though the single infrared camera 16 is unable to accurately detect the distance up to an object instantaneously unlike stereo cameras which can accurately detect the distance up to an object based on the parallax of the object between two images captured respectively thereby, the single infrared camera 16 is used. However, since it is judged whether the monitored animal is a hazardous animal or not, based on the posture shape of the animal, it is possible to accurately and instantaneously judge whether the monitored animal is a hazardous animal or not from one image. Therefore, the vehicle periphery monitoring apparatus 10 can be reduced in cost.

The present invention is not limited to the above embodiment, but may employ various arrangements based on the disclosure of the present description.

Figure 12:
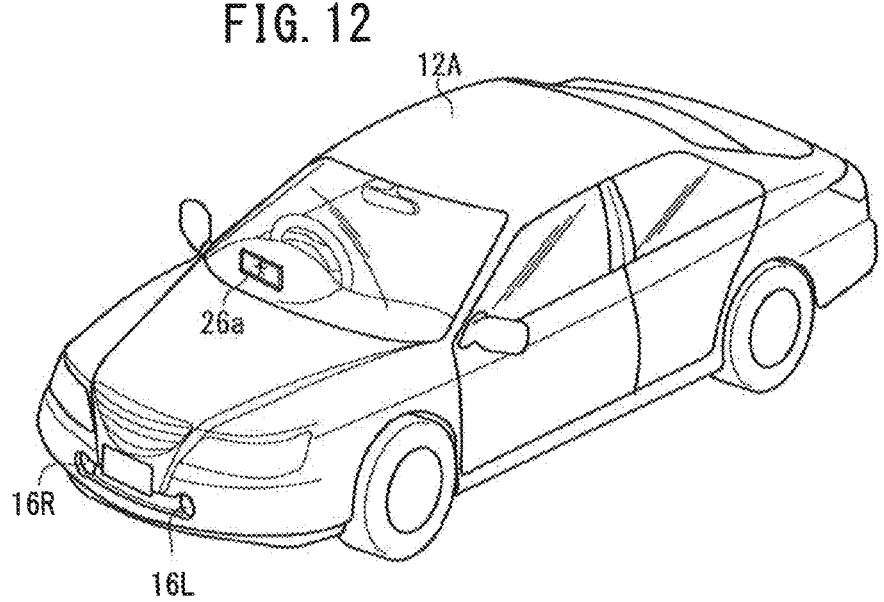
FIG. 12 is a perspective view of a vehicle incorporating a vehicle periphery monitoring apparatus according to a modification.

For example, as shown in FIG. 12, a vehicle periphery monitoring apparatus may have a set of left and right infrared cameras 16R, 16L mounted on a vehicle 12A. The infrared cameras 16R, 16L for use as stereo cameras are mounted on a front bumper of the vehicle 12A in respective positions that are substantially symmetrical with respect to the center of the vehicle 12A in the transverse directions thereof. The two infrared cameras 16R, 16L have parallel optical axes, respectively, and are fixed in position at the same height from the road surface. As well known in the art, the vehicle periphery monitoring apparatus with the set of left and right infrared cameras 16R, 16L regards high-temperature areas in an image of the periphery of the vehicle 12A which is captured by the infrared cameras 16R, 16L as objects, calculates the distance up to one object based on the parallax of the one object in the left and right images captured by the infrared cameras 16R, 16L according to triangulation, detects an object that may affect the travel of the vehicle 12A, i.e., an animal having a possibility of collision with the vehicle 12A, based on the positions of the objects, instantaneously judges whether the object is a hazardous animal or not, and generates an attention calling output signal if the object is judged as a hazardous object.

The vehicle periphery monitoring apparatus may employ a general digital video camera (image capturing device) for capturing an image of an ordinary visible range as a single camera or stereo camera as with the present embodiment, rather than the infrared camera or cameras.

Figure 13:
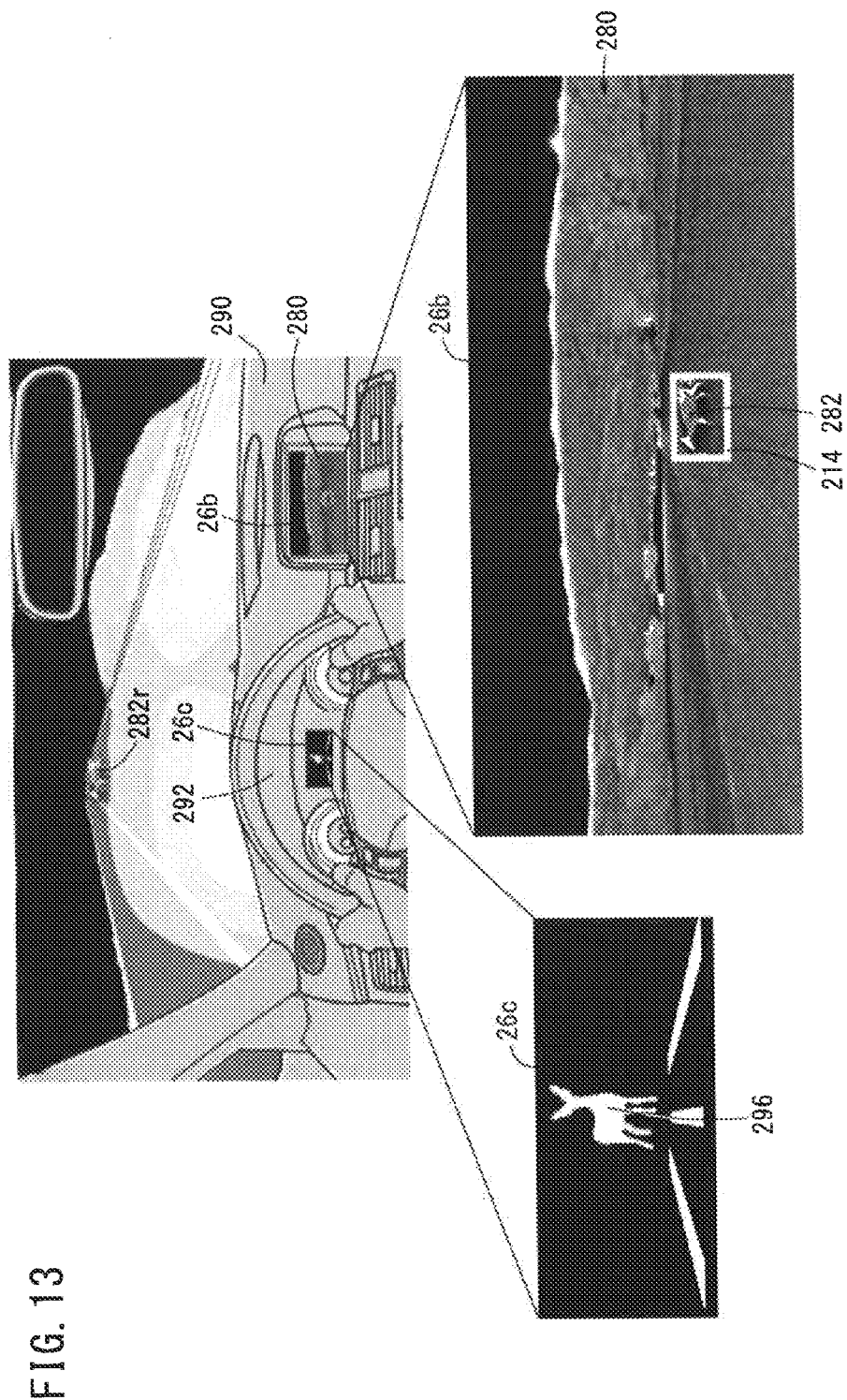
FIG. 13 is a schematic view of an inside of the vehicle as viewed by a driver, which includes a general-purpose display device displaying a hazardous animal in highlight in a grayscale image and an MID (Multi Information Display) device displaying an animal icon for making the driver conjure up the animal that is present in front of the vehicle.

As shown in FIG. 13, which illustrates in an upper section thereof an inside of the vehicle as viewed by the driver while the vehicle 12 is being driven at night, the image display device 26 includes a display device 26b (general-purpose display device) disposed centrally on a dashboard 290 for use with a navigation apparatus and an audio apparatus. The display device 26b displays a grayscale image (video image) 280 captured by the infrared camera 16 (16L), as shown at an enlarged scale in a lower right section of FIG. 13, the grayscale image 280 including an image of a hazardous animal 282 that represents a hazardous animal 282r which is actually present in a far position in front of the front windshield of the vehicle and that is displayed and surrounded by a red thick frame 214, for warning the driver. At the same time, the speaker 24 issues a warning about the hazardous animal 282r.

When the display device 26b as the general-purpose display device displays the hazardous animal 282 surrounded by the red thick frame 214, an MID (Multi-Information Display) device 26c disposed centrally in a meter unit 292 in front of the driver as a display unit of relatively low resolution may display an animal icon 296 (deer icon in this case) as shown at an enlarged scale in a lower left section of FIG. 13, thereby for warning the driver. According to the present embodiment, the animal icon 296 is not displayed unless the hazardous animal 282 surrounded by the red thick frame 214 is displayed on the display device 26b. It is desirable that the animal icon 296 should be displayed in a striking color such as yellow or the like or in a blinking fashion in order to draw the driver's attention to the hazardous animal. The three lines that are displayed beneath the animal icon 296 represent road icons for making the driver conjure up the left and right edges and the center line of the road which are displayed at all times when the vehicle periphery monitoring apparatus 10 is activated.

The invention claimed is:

1. A vehicle periphery monitoring apparatus for monitoring a periphery of a vehicle using an image captured by an image capturing device mounted on the vehicle, comprising:
   an animal detection processor configured to detect an animal as an object to be monitored from the image; and
   an animal hazard degree judgment section configured to judge whether the animal is a hazardous animal which may possibly affect travel of the vehicle or not based on a posture shape of the animal which is detected from the image;
   wherein the animal hazard degree judgment section judges that the animal is a hazardous animal if an angle of a neck of the animal with respect to a torso thereof is directed upwardly in the posture shape of the animal.

2. The vehicle periphery monitoring apparatus according to claim 1, wherein the animal hazard degree judgment section judges that the animal is a hazardous animal if legs are detected in the posture shape of the animal.

3. The vehicle periphery monitoring apparatus according to claim 1, wherein the animal hazard degree judgment section judges that the animal is a hazardous animal if a distance from a position of the animal to a road edge toward which a face of the animal is directed is greater than a predetermined distance in the posture shape of the animal.

4. The vehicle periphery monitoring apparatus according to claim 2, wherein when the animal hazard degree judgment section detects a plurality of candidates for the hazardous animals from the image, the animal hazard degree judgment section judges one of the detected candidates for the hazardous animals which contacts a road surface at a position that is closest to the vehicle, as a hazardous animal.

5. The vehicle periphery monitoring apparatus according to claim 2, wherein when the animal hazard degree judgment section detects a plurality of candidates for the hazardous animals from the image, the animal hazard degree judgment section judges one of the detected candidates for the hazardous animals that is present in a position closest to a direction of travel of the vehicle, as a hazardous animal.

6. The vehicle periphery monitoring apparatus according to claim 1, wherein the image capturing device comprises a single image capturing device.

* * * * *